United States Patent [19]

Sakata et al.

[11] Patent Number: 4,507,895

[45] Date of Patent: Apr. 2, 1985

[54] RADIALLY ADJUSTABLE INTERNAL GRINDER

[75] Inventors: Hideo Sakata; Tokuzo Nakaoki, both of Kawasaki, Japan

[73] Assignee: Mitutoyo Mfg. Co. Ltd., Tokyo, Japan

[21] Appl. No.: 444,397

[22] PCT Filed: Apr. 2, 1982

[86] PCT No.: PCT/JP82/00097

§ 371 Date: Nov. 15, 1982

§ 102(e) Date: Nov. 15, 1982

[87] PCT Pub. No.: WO82/03354

PCT Pub. Date: Oct. 14, 1982

[30] Foreign Application Priority Data

| Apr. 8, 1981 | [JP] | Japan | 56-52734 |
| Apr. 10, 1981 | [JP] | Japan | 56-54659 |
| Apr. 10, 1981 | [JP] | Japan | 56-54660 |
| Nov. 4, 1981 | [JP] | Japan | 56-176925 |
| Nov. 4, 1981 | [JP] | Japan | 56-176926 |
| Nov. 16, 1981 | [JP] | Japan | 56-183500 |

[51] Int. Cl.³ .................... B24B 5/08; B24B 33/00
[52] U.S. Cl. ............................. 51/98 R; 51/351;
299/80; 408/153; 82/59

[58] Field of Search ................... 51/338–351, 51/330, 331, 92 R, 98 R, 34 E, 34 C, 34 H; 74/768, 769, 785, 793; 82/59, 67, 68; 175/173, 202; 299/80; 408/152, 153

[56] References Cited

U.S. PATENT DOCUMENTS

| 1,381,416 | 6/1921 | Heindl | 51/92 R |
| 1,652,885 | 12/1927 | Allyn | 51/351 |
| 2,334,838 | 11/1943 | Prange | 51/351 X |
| 2,830,413 | 4/1958 | Dahlerup | 51/92 R X |
| 3,216,155 | 11/1965 | Sunnen | 51/347 |
| 3,393,472 | 7/1968 | Sunnen | 51/34 H |
| 3,469,886 | 9/1969 | Marberg | 299/80 |
| 4,275,530 | 6/1981 | Largeteau | 51/340 X |

FOREIGN PATENT DOCUMENTS

874248 8/1961 United Kingdom ................ 51/344

*Primary Examiner*—Robert P. Olszewski
*Attorney, Agent, or Firm*—Flynn, Thiel, Boutell & Tanis

[57] ABSTRACT

An internal grinder for grinding or polishing the inner surface and the like of a cylinder or ring gauge. A plurality of grind stones (256) are held by a grind stone holding member (251) in a manner to be movable in the radial directions of a spindle (203) and a projection value adjusting member (241) having engaged therewith the plurality of grind stones (256), respectively, is rotated relative to said grind stone holding member (251), whereby the plurality of grind stones (256) are adjusted in their projection values.

7 Claims, 21 Drawing Figures

RADIALLY ADJUSTABLE INTERNAL GRINDER

FIELD OF THE INVENTION

This invention relates to an internal grainder for grinding an inner surface of a cylinder or a ring gauge, and more particularly to an internal grinder wherein a projection values of grind stones are adjustable.

BACKGROUND OF THE INVENTION

Heretofore, there have been known internal grinders for cutting or grinding an inner surface of a cylinder or a ring gauge. As shown in FIG. 1, the conventional internal grinder has been normally constructed such that a ring-shaped work 1 is clamped by a chuck 2 and rotated, an inner surface of the work 1 is ground by a grind stone 4 affixed to a spindle 3 movable in a diametral direction of this work 1 or along the inner surface thereof.

However, in the case of the conventional internal grinder with the above-described arrangement, grinding of the work 1 is concentrated at one portion, to which is abutted the grind stone 4, and hence, such disadvantages have been presented that it is difficult to achieve uniformalization of grinding and the work 1 tends to become elliptical.

Furthermore, in the conventional internal grinder, a spindle 3 of the grind stone 4 is moved in the diametral direction of the work 1 and along the inner surface of the work 1, whereby vibrations tend to be caused to the spindle 3, thus affecting the accuracy of grinding.

Further, as for the chuck 2, there have been many cases of adopting three-point chucks as shown in FIG. 1, whereby the work 1 cannot be clamped by the chuck 2 unless it is round-shaped, and troublesome centering work is required for the chuck 2 to clamp the work 1.

Moreover, the grind stone 4 has had to be often replaced with new one depending on the wear of the grind stone. In this case, rotation of the grind stone must be stopped each time replacement is effected, thus resulting in lowered workability.

The present invention has as its object the provision of an internal grinder, in which the center alignment of the work is simplified, grinding accuracy is improved, and the workability is excellent.

SUMMARY OF THE INVENTION

The present invention contemplates that, in an internal grinder comprising a grind stone head provided thereon with a plurality of grind stones in the rotating direction, a spindle secured at one end thereof with the grind stone head, a mount having work fixing means and a moving mechanism for moving relative positions of the spindle and the mount in the axial direction of the spindle, the grind stone head being constituted by a grind stone holding member for holding the plurality of grind stones in such a manner that the grind stones are respectively movable in the radial directions of the spindle, and a projection value adjusting member engageable with the plurality of grind stones, respectively, and capable of moving the plurality of grind stones, respectively, in the radial directions of the spindle when engaged positions of the grind stones are varied due to rotations of the grind stones relative to the grind stone holding member about the axis of the spindle as the work is simultaneously ground by the plurality of grind stones, whereby grinding is not concentrated at one portion, grinding is uniformly effected and the roundness of the finished surface is improved. Further, the projection value adjusting member and the grind stone holding member are rotated relative to each other, to simultaneously move the plurality of grind stones in the radial directions of the spindle so as to adjust the projection values of the grind stones, whereby grinding can be effected without moving the spindle in the diametral direction or along the inner surface of the work, so that vibrations of the spindle, which would render adverse influence to the grinding accuracy, can be avoided.

According to the present invention, in affixing the work onto the mount through the work fixing means, the plurality of grind stones are projected in the radial directions of the spindle to abut against the inner surface of the work, whereby the fixed position of the work is determined, thus eliminating the need for troublesome centering work.

Further, according to the present invention, when the grind stones are worn, the grind stones are further projected so as to continue the grinding, whereby the frequency of need for replacing the grind stones is reduced, thereby enabling to improve the workability.

DETAILED DESCRIPTION OF THE PREFERRED EMBODIMENTS

Description will hereunder be given of the embodiments of the present invention with reference to the drawings.

Figure 1:
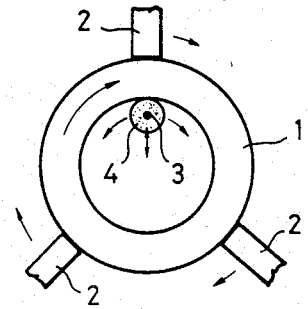
FIG. 1 is an explanatory view showing the general arrangement of the conventional internal grinder.
Figure 2:
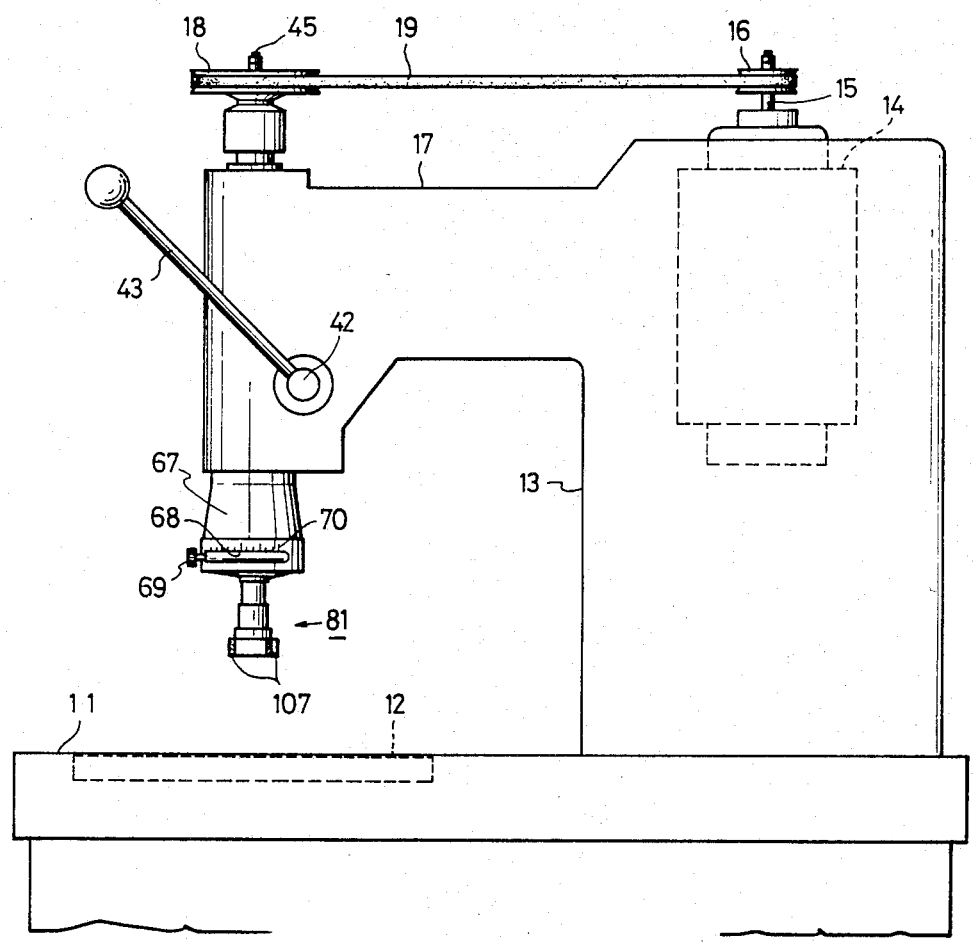
FIG. 2 is a side view showing the general arrangement of a first embodiment of the internal grinder according to the present invention.

FIG. 2 shows the general arrangement of the first embodiment. In the drawing, work fixing means 12 is embedded at a predetermined position of a mount 11, and this work fixing means 12 is adapted to detachably fix a work, not shown, which has been rested on the mount 11, through an electromagnetic action.

A support 13 is erected at a side, where the work fixing means 12 is not provided, of the mount 11, and this support 13 incorporates therein a motor 14 as being a driving device. A drive shaft 15 of the motor 14 is vertically, upwardly projected from the top end face of this support 13, and a drive pulley 16 is affixed to this drive shaft 15.

Provided at one side surface of the upper portion of the support 13 is a column 17 projecting horizontally, leftwardly in the drawing, and the forward end portion of the column 17 is disposed substantially, vertically upwardly of the work fixing means 12. Disposed upwardly of the forward end portion of the column 17 is a transmission pulley 18, and a belt 19 for transmitting a driving force is wound around this transmission pulley 18 and the drive pulley 16.

Figure 3:
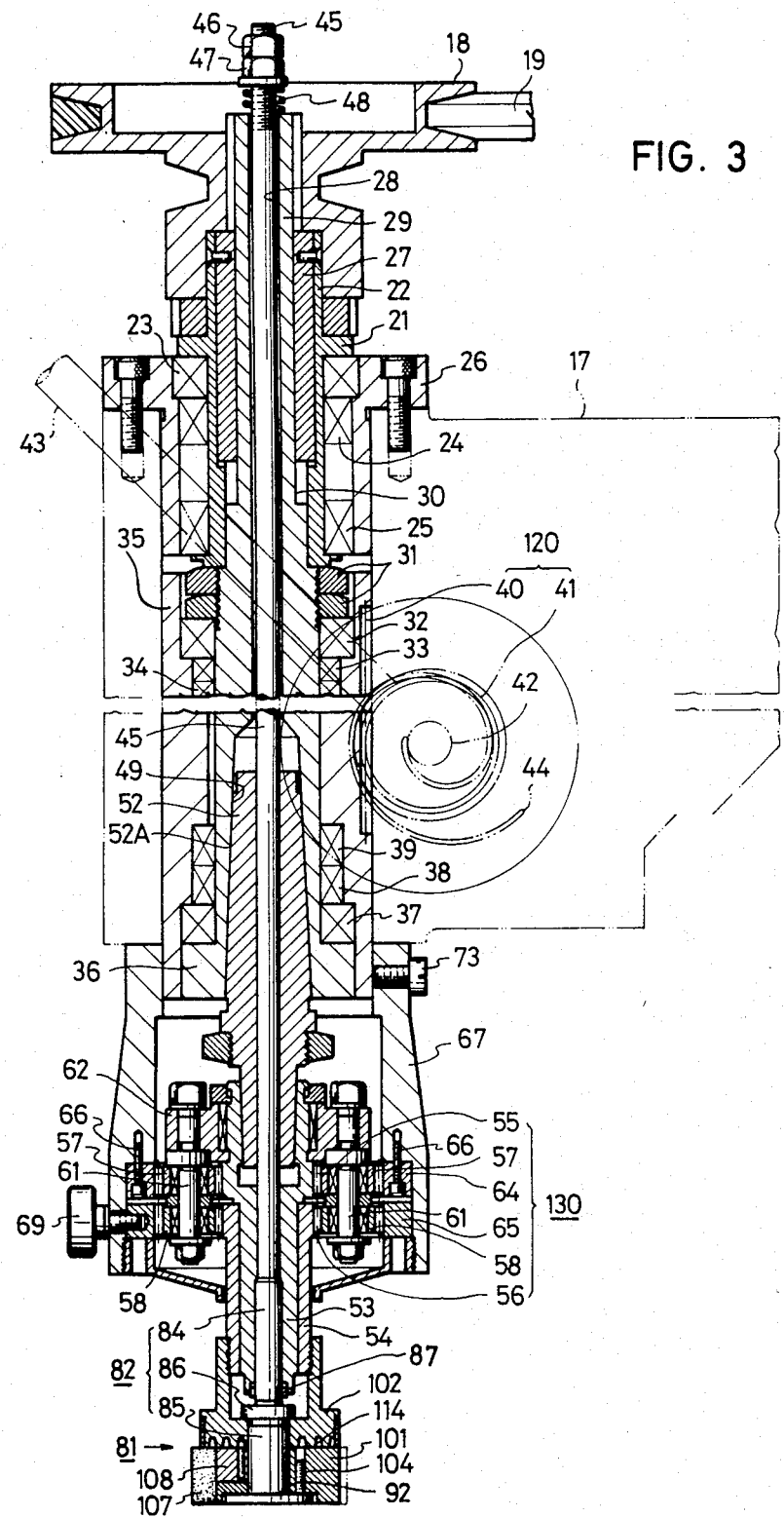
FIG. 3 is a sectional view showing the essential portions of the first embodiment.

As enlargedly shown in FIG. 3, inserted into the interior of the lower end portion of the transmission pulley 18 is the upper end portion of a cylindrical rotator 22 having a flange portion 21. This rotator 22 is rotatably supported by a support frame 26 through a thrust bearing 23 disposed on the undersurface of the flange portion 21, and two radial bearings 24, 25, and the support frame 26 is threadably secured to the column 17. Additionally, threadably secured to the inner surface of the rotator 22 are a plurality of slide keys 27, which are meshed with spline grooves 30 formed in the upper end portion of a spline shaft 29 having a hollow portion 28, and the spline shaft 29 is adapted to be movable in the vertical direction with a predetermined range, while rotating together with the transmission pulley 18.

Coupled onto the outer periphery of the lower portion of the spline shaft 29 is a cylindrical support member 35, which is vertically slidably and unrotatably supported on the column 17. Additionally, interposed between the inner peripheral surfaces of the upper and lower ends of the support member 35 and the outer peripheral surface of the spline shaft 29 are thrust bearings 32, 37 and pairs of radial bearings 33, 34 and 38, 39, which are clamped between a flange 36 integrally formed on the lower end portion of the spline shaft 29 and nuts 31 threadably coupled onto the substantially central portion of the spline shaft 29, whereby the spline shaft 29 is rotatably supported by the support member 35.

Provided on the outer peripheral surface on the side of the support 13 of the support member 35 is a rack 40 in the vertical direction, i.e., the longitudinal direction of the support member 35, and a pinion 41 is meshed with this rack 40. A pinion shaft 42 of this pinion 41 is rotatably supported at opposite ends thereof on predetermined positions on the column 17, and the pinion shaft 42 has secured thereto a lever 43 capable of rotating the pinion 41 through a predetermined angle. Furthermore, a torsion coil spring 44 (for biasing the pinion 41 in a direction in which the support member 35 rises by means of the rack 40) is confined between the column 17 and the pinion shaft 42.

The hollow portion 28 of the spline shaft 29 is penetrated through the central portion of the spline shaft 29 in the axial direction and over the total length of the spline shaft 29, and a rotary drive shaft 45 is inserted through the hollow portion 28. The top end portion of this rotary drive shaft 45 upwardly projects from the hollow portion 28 in the drawing, and this top end portion is secured thereto with a nut 46 and a washer 47, a compression spring 48 is confined between the washer 47 and the top end face of the spline shaft 29, whereby the rotary drive shaft 45 is vertically upwardly biased relative to the spline shaft 29.

Furthermore, the hollow portion 28 of the spline shaft 29 is provided at the lower end portion thereof with a tapered surface 49 having a larger inner diameter of the bottom end than that of the top end thereof, and coupled into this tapered surface 49 is a tapered outer peripheral surface 52A formed on the upper end portion of a shank 52 for transmitting a driving force.

Figure 4:
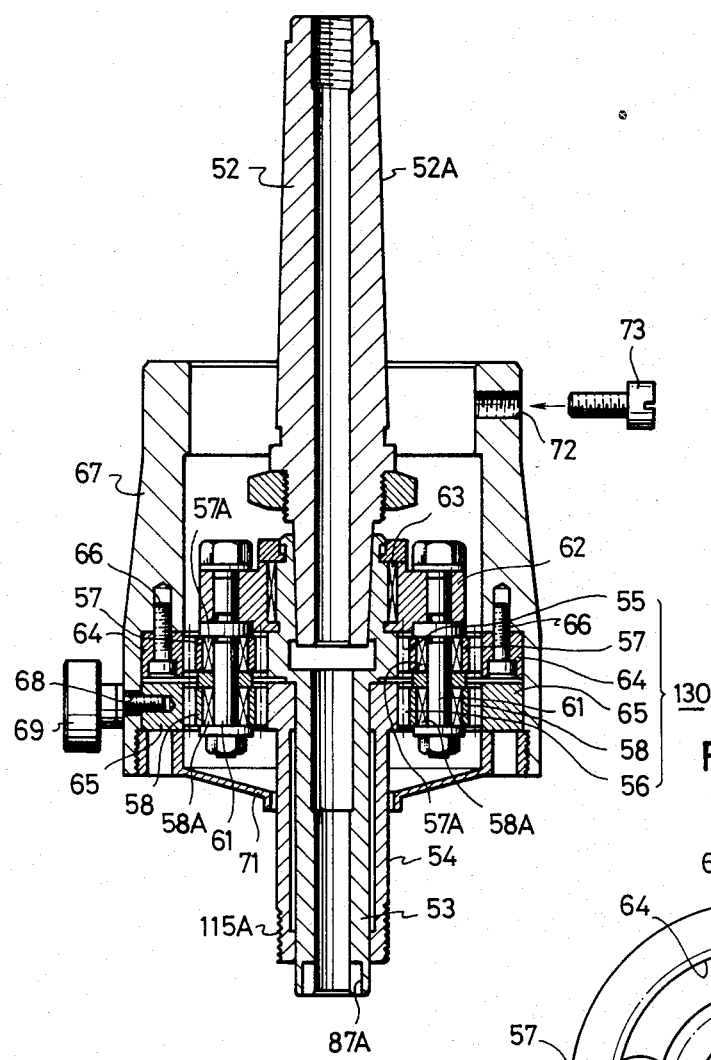
FIG. 4 is a sectional view enlargedly showing a differential mechanism used in the first embodiment.

As shown in FIG. 4, a tubular inner main drive shaft 53 is taper-coupled onto the lower end portion of the shank 52 for transmitting the driving force, and a tubular outer main drive shaft 54 is rotatably coupled onto the outer peripheral surface of the inner main drive shaft 53. Formed at predetermined positions on the respective outer peripheral surfaces of the inner and outer main drive shafts 53 and 54 are a first and a second toothed portions 55 and 56 being identical in shape with each other, and meshed with these toothed portions 55 and 56 are pluralities of first and second planet gears 57 and 58, respectively.

Figure 5:
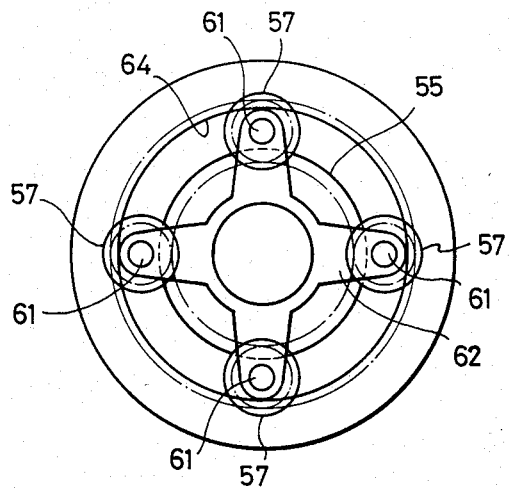
FIG. 5 is an explanatory view showing the arrangement of the differential mechanism.

These planet gears 57 and 58 are rotatably supported by one and the same planet gear shaft 61 through bearings 57A and 58A, respectively. As shown in FIG. 5, these planet gear shafts 61 are disposed at four positions being spaced 90° apart from one another along the outer peripheries of the toothed portions 55 and 56 through the substantially cross-shaped rotary arm 62. Additionally, the rotary arm 62 is rotatably secured to the outer peripheral surface of the upper end portion of the inner main drive shaft 53 through a bearing 63.

The first and second planet gears 57 and 58 are respectively meshed with a stationary internal gear 64 and a movable internal gear 65, both of which are ring-shaped and identical in shape with each other. The stationary internal gear 64 is affixed to a substantially inverted pot-shaped outer frame 67 through a set-screw 66, while the movable internal gear 65 is arranged to slide on the inner peripheral surface of the outer frame 67 in the circumferential direction, and the movement value in the circumferential direction is adjustable by causing a finger grip 69 to slide, which is inserted through an adjusting groove 68 (Refer to FIG. 2) penetrated in the circumferential direction at a predetermined position on the outer frame 67. Additionally, a graduation 70 for indicating a movement value of the finger grip 69 is provided on the end edge of the adjusting groove 68.

Secured to the lower end portion of the outer frame 67 is a substantially inverted unbrella-shaped bottom cover 71 formed at the central portion thereof with a round hole, while a setting hole 72 is penetratingly provided at a predetermined portion on the side surface of the upper end portion of the outer frame 67, and the outer frame 67 is solidly secured to the support member 35 through a set-screw 73 threadably coupled into this setting hole 72.

The lower end portion of the rotary drive shaft 45 extends through the central portion of the shank 52 for transmitting the driving force and reaches the interior of a hollow portion of the inner main drive shaft 53, where it is threadably coupled into a threaded hole 83 penetrated on the top end face of a spindle 82, and the center line of the rotary drive shaft 45 and the center axis of the spindle 82 are disposed on one and the same straight line (Refer to FIG. 3).

Figure 6:
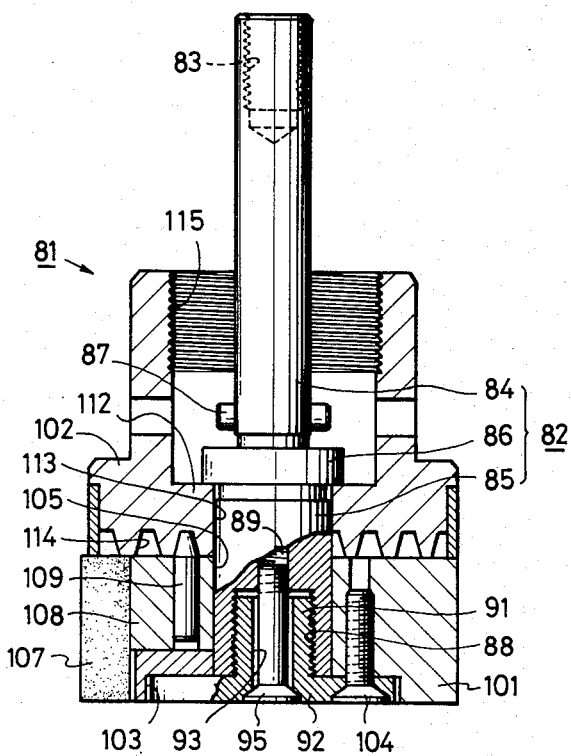
FIG. 6 is a sectional view enlargedly showing a grind stone head used in the first embodiment.
Figure 7:
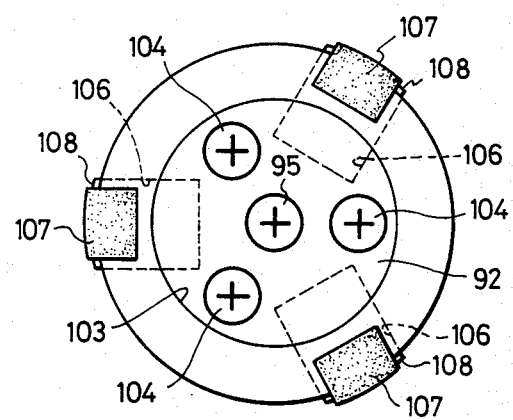
FIG. 7 is a bottom view showing the grind stone head.

The spindle 82 is provided at the lower end portion thereof as shown in the drawing with a grind stone head 81, and, as enlargedly shown in FIGS. 6 and 7, the spindle 82 is formed into a stepped columnar rod provided at the upper end portion thereof with a small diameter portion 84 and at the lower end portion thereof with a large diameter portion 85. The spindle 82 is further provided at the bottom portion of the small diameter portion 84 thereof with a disk-shaped flange portion 86 having a diameter larger than the large diameter portion 85. Furthermore, provided on the small diameter portion 84 close to the flange portion 86 is a radially projecting engageable pin 87, which is coupled into an engageable groove 87A formed on the inner surface of the lower end portion of the inner main drive shaft 53, so that rotation of the inner main drive shaft 53 can be imparted to the spindle 82.

Penetratingly formed on the large diameter portion 85 is a threaded hole 88 downwardly opening and extending in the axial direction of the spindle 82, and a small diameter internally threaded portion 89 is formed at the innermost part of this threaded hole 88. Threadably coupled into the threaded hole 88 is a small column-shaped threadably coupled-in portion 91 projecting from a substantially disk-shaped bottom plate 92. A shaft hole 93 is penetratingly formed in the central portion of the bottom plate 92, which is inserted through a shaft hole 93 and solidly secured to the large diameter portion 85 by means of the small diameter internally threaded portion 89 and a shaft screw 95, and further, a grind stone holding member 101 and a projection value adjusting member 102 are clamped between the flange portion 86 and the bottom plate 92.

Figure 8:
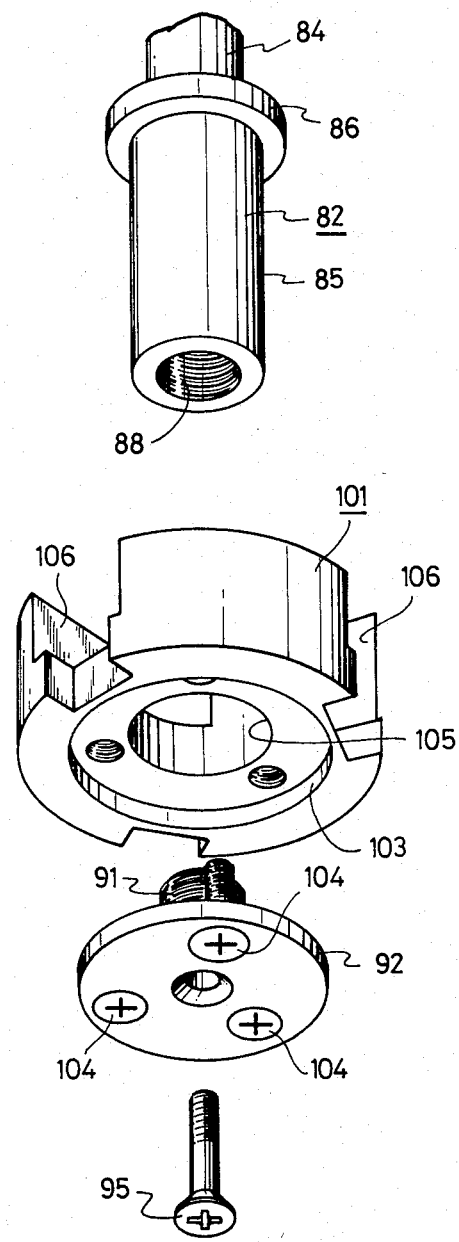
FIG. 8 is a disassembled perspective view showing the configurations of the essential portions of the grind stone head.

Furthermore, the bottom plate 92 is coupled into a round-shaped groove 103 formed at the bottom end face of the grind stone holding member 101 and affixed to the grind stone holding member 101 by means of three fastening screws 104, which are spaced at regular angular intervals of 120° from one another on a hypothetical circumference centered about the spindle 82 (Refer to FIG. 8).

Figure 9:
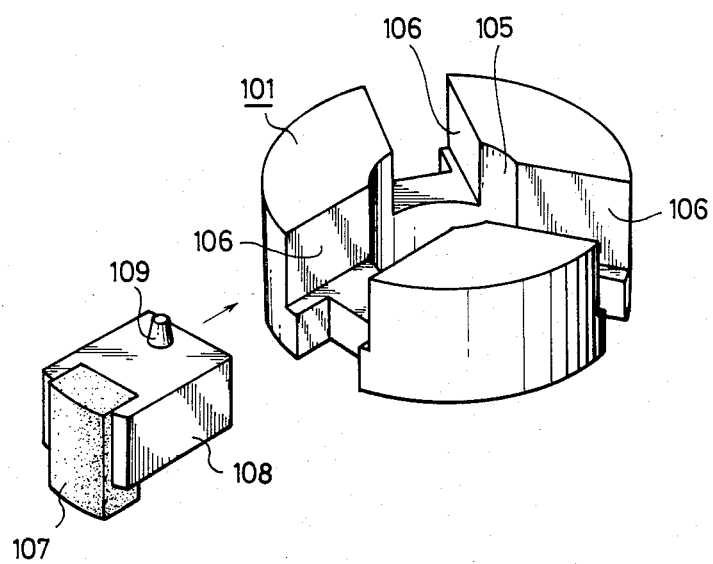
FIG. 9 is a disassembled perspective view showing the configuration of a grind stone holding member used in the first embodiment.

This grind stone holding member 101 is of a substantially columnar shape and formed at the central portion thereof with a center hole 105 for receiving therein the large diameter portion 85 of the spindle 82. In addition, as shown in FIG. 9, the grind stone holding member 101 has radial direction guides 106 disposed at three positions. These radial direction guides 106 are disposed at positions intermediate of the fastening screws 104, respectively, are spaced at regular angular intervals of 120° from one another on a hypothetical circumference centered about the spindle 82, and are each constituted by a groove being of square cross section and provided in the radial direction of the spindle 82.

The radial direction guides 106 are each slidably coupled thereinto with a grind stone holder 108 formed into a substantially rectangular parallelepiped, which is planted at the outer peripheral end thereof with a grind stone 107, respectively, and the grind stones 107 are held by the grind stone holding member 101 in a manner to be movable in the radial directions of the spindle 82, respectively.

The grind stone holders 108 are each plantingly provided therein with an adjusting pin 109, the top end portion of which is projected from the top end face of the grind stone holder 108. Positions of the adjusting pins 109 planted in the grind stone holders 108 in the radial direction of the spindle 82 are arranged such that, when the adjusting pins 109 are engaged with the projection value adjusting guide 114 formed on the projection value adjusting member 102, the three grind stones 107 in the radial direction of the spindle 82 are identical in projection value with one another.

Figure 10:
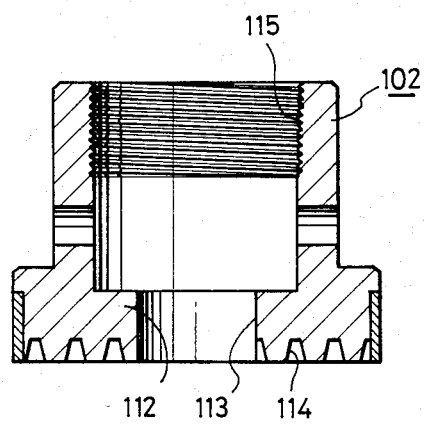
FIG. 10 is a sectional view enlargedly showing a projection value adjusting member used in the first embodiment.
Figure 11:
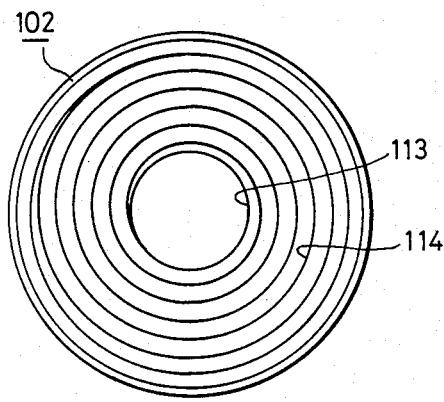
FIG. 11 is a bottom view showing the adjusting member.

As shown in FIGS. 10 and 11, the projecting value adjusting member 102 is formed in a substantially tubular shape having a bottom, and formed at the central portion of the bottom face portion 112 with an insert hole 113 for receiving the large diameter portion 85 of the spindle 82. The projection value adjusting member 102 is slidably abutted against the flange portion 86 at the peripheral edge of the insert hole 113 formed on the top end face of the bottom face portion 112 thereof. The bottom face portion 112 is provided at the bottom end face thereof with the projection value adjusting guide 114 formed into an Archimedean spiral having its origin on the axis of the spindle 82, and the adjusting pins 109 of the grind stone holders 108 are slidably coupled into and engaged with the projection value adjusting guide 114. In addition, the aforesaid Archimedean spiral means a curve wound round an origin given by an equation of polar coordinates of $\gamma = a\theta$ (a is a constant).

Formed on the inner peripheral surface of the upper end portion of the projection value adjusting member 102 is a threaded portion 115, which is threadably coupled onto a threaded portion 115A (Refer to FIGS. 3 and 4) formed on the outer peripheral surface of the lower end portion of the outer main drive shaft 54, and the projection value adjusting member 102 is adapted to rotate integrally with the outer main drive shaft 54.

The rack 40 and the pinion 41 constitute a transfer mechanism 120 for moving the grind stone head 81 relative to the mount 11 in the axial direction of the spindle 82. Further, the toothed portions 55 and 56 as being the sun gears, planet gears 57 and 58, the stationary internal gear 64 and the movable internal gear 65 constitute a differential mechanism 130 for rotating the projection value adjusting member 102 about the axis of the spindle 82, as being the center of rotation, relative to the grind stone holding member 101 during rotation of the spindle 82.

Description will hereunder be given of operation of the first embodiment. After the work is mounted at a suitable position on the mount 11 at a state where the work fixing means 12 is not operated, the lever 43 is operated to insert the grind stone head 81 to the inner surface of the work as being a position to be ground, and then, the finger grip 69 is rotatably operated in a predetermined direction. When the finger grip 69 is operated to rotate the movable internal gear 65, the projection value adjusting member 102 is rotated relative to the grind stone holding member 101 by way of the second planet gear 58, the second toothed portion 56 and the outer main drive shaft 54. Formed on the bottom end face of the bottom face portion 112 of the projection value adjusting member 102 is the projection value adjusting guide 114, to which are slidably coupled adjusting pins 109 of the grind stone holders 108, so that the three grind stone holders 108 can be advanced or retracted equidistantly in the radial direction along the radial direction guide 106 commensurate to a rotation value of the projection value adjusting member 102. In this case, if the finger grip 69 is operated to abut the grind stones 107 of the three grind stone holders 108 against the surfaces to be cut, respectively, then the grind stones 107 become disposed equidistantly of the axis of the spindle 82 at all times, so that the centering work can be completed.

After the centering work has been completed as described above, the work fixing means 12 on the mount 11 is operated to fix the work onto the mount 11. If the motor 14 is energized in this condition, then the transmission pulley 18 is rotated through the belt 19. The rotation of the transmission pulley 18 is imparted to the spline shaft 29 through the rotator 22 and the slide keys 27, and further, transmitted to the inner main drive shaft 53 by way of the shank 52 for transmitting the driving force. The rotation of the inner main drive shaft 53 is imparted to the spindle 82 through the engageable groove 87A and the engageable pin 87. More specifically, the spindle 82 is threadably coupled to the lower end portion of the rotary drive shaft 45 and the washer 47 and the compression spring 48 are secured to the top end portion of the rotary drive shaft 45, whereby the engageable pin 87 is coupled to the engageable groove 87A in a locked state, so that the inner main drive shaft 53 and the spindle 82 can be integrally rotated.

Furthermore, the rotation of the inner main drive shaft 53 is transmitted to the outer main drive shaft 54 through the planet gear 57, the planet gear shaft 61, the planet gear 58, the stationary internal gear 64 and the movable internal gear 65. In this case, when the movable internal gear 65 is solidly secured, the respective pairs of gears 55 and 56, 57 and 58, and 64 and 65 are identical in configuration with each other, whereby the inner main drive shaft 53 and the outer main drive shaft 54 are rotated integrally and in synchronism with each other. No relative rotation occurs between the grind stone holding member 101 connected through the spindle 82 to the inner main drive shaft 53 and the projection value adjusting member 102 connected to the outer main drive shaft 54, and an engaged position of the adjusting pin 109 of the grind stone holder 108 with the projection value adjusting guide 114 is made invariable, whereby the projection values of the grind stones 107 are not varied.

On the other hand, when the finger grip 69 is operated, the movable internal gear 65 is rotated to cause a difference in phase of rotation between the planet gears 57 and 58, with the result that the outer main drive shaft 54 rotates relative to the inner main drive shaft 53. Because of this, the projection value adjusting member 102 and the grind stone holding member 101 are deviated from each other during operation of the finger grip 69, the engaged position of the adjusting pin 109 of the grind stone holder 108 with the projection value adjusting guide 114 of the projection value adjusting member 102 is varied, whereby the grind stone holders 108 linearly move along the radial direction guides 106 of the grind stone holding member 101. In consequence, even when the spindle 82 is rotated, operation of the finger grip 69 makes it possible to adjust the projection values in the radial directions of the grind stones 107.

The projection values of the grind stones 107 are adjusted by the operation of the finger grip 69 as described above. Therefore, the projection values of the grind stones 107 are adjusted while the graduation 70 is being watched, so that grinding can be performed through motions of the optimum load. Additionally, in case where regrinding of the same work is performed by replacing the grind stones 107 with new ones for finishing work, no centering work is required.

The present embodiment with the above-described arrangement can offer the following advantages.

The center alignment of the work is highly facilitated, and automatic centering work can be effected. Furthermore, while the spindle 82 is being rotated to perform grinding, the projection values of the grind stones 107 in the radial directions can be adjusted. Hence, the grinding can be continued to the final finish with the same center alignment being maintained.

Further, the frequency of required replacement of the grind stones with new ones is sharply reduced as compared with the conventional internal grinder in which the grind stone has been frequently forced to be replaced with new one depending on the progress of grinding and the configuration of the work, and the labor required for the operation in replacing the grind stone with new one can be reduced to a great extent. Additionally, the present embodiment can be used to the works having a diameter from small to large, and moreover, applied to a grinding in which the inner diameters of the work are variable at predetermined positions, i.e., grinding of a work having different diameters, by simultaneously performing the adjustment of the projection values of the grind stones 107 and the operation of the lever 43. Furthermore, even in such a case as described above, the grinding with the same center alignment can be readily performed.

The present embodiment can offer the advantages that it becomes possible to perform high speed grinding because the simultaneous three-point grinding by use of three grind stones 107, and moreover, the roundness of the ground portions is greatly improved.

Further, in the present embodiment, the projection values of the grind stones 107 can be readily adjusted, so that the grinding can be performed at the optimum grinding speed depending upon the types of the grind stones and the material quality of the work. Additionally, the three grind stones 107 are arranged equidistantly from the spindle 82 at all times and spaced apart from one another at regular intervals, whereby the loads applied to the respective grind stones 107 are properly balanced, so that the grinding under the load of 100% can be effected.

Moreover, in the present embodiment, the rotary drive shaft 45, the spindle 82 and the like are set along a so-called longitudinal axis in the vertical direction, and yet, the spindle 82. is not adapted to be moved in the radial direction of the work and on the internal surface thereof, whereby vibrations due to the rotation seldom occur, so that the grinding can be performed with high accuracy.

Furthermore, the work fixing means 12 embedded in the mount 11 is adapted to utilize an electromagnetic action, so that the work fixing means 12 can fix the work onto the mount 11 irrespective of the configuration of the work.

In addition, in the above-described embodiment, description has been given of the three grind stones 107 are centered about the spindle 82 and arranged at regular angular intervals of 120°, however, the number of the grind stones should not necessarily be limited to three, but, may be more or less than three. The grind stones 107 need not necessarily be arranged at regular intervals, however, if they are arranged at regular intervals, such an advantage can be offered that the grinding accuracy, and particularly, the roundness can be improved.

The projection value adjusting guide 114 of the projection value adjusting member 102 has been described to be formed into an Archimedian spiral, however, the shape of the projection value adjusting guide 114 should not necessarily be limited to this, but, may be replaced one, in which, for example, circularly arcuate guides being of shapes identical with one another are arranged at three positions substantially in the radial directions as centered about the spindle 82, at regular angular intervals of 120°, like vanes of a fan, with the guides being engaged with the adjusting pins 109, respectively.

In the above-described embodiment, the spindle 82 is locked against the spline shaft 29 through the resiliency of the compression spring 48 by way of the rotary drive shaft 45, but, the locking means may be one in which is used a strong electromagnet and the like.

Further, the work fixing means 12 should not necessarily be limited to one utilizing only the electromagnetic action, but may be replaced by one, in which, for example, only the electromagnetic action is utilized during the centering work before the grinding, and thereafter, during the subsequent grinding, mechanical means may be additionally utilized so as to increase a fixing force.

To adjust the positional relationship between the mount 11 and the grind stone head 81, the spline shaft 29 and the rotary drive shaft 45 are vertically moved without vertically moving the transmission pulley 16, but, this may be replaced by an arrangement that the upper portion of the mount 11 including the transmission pulley 16 and the motor 14 as a whole is vertically moved, or that the mount 11 is vertically moved.

Description will hereunder be given of the second embodiment.

Figure 12:
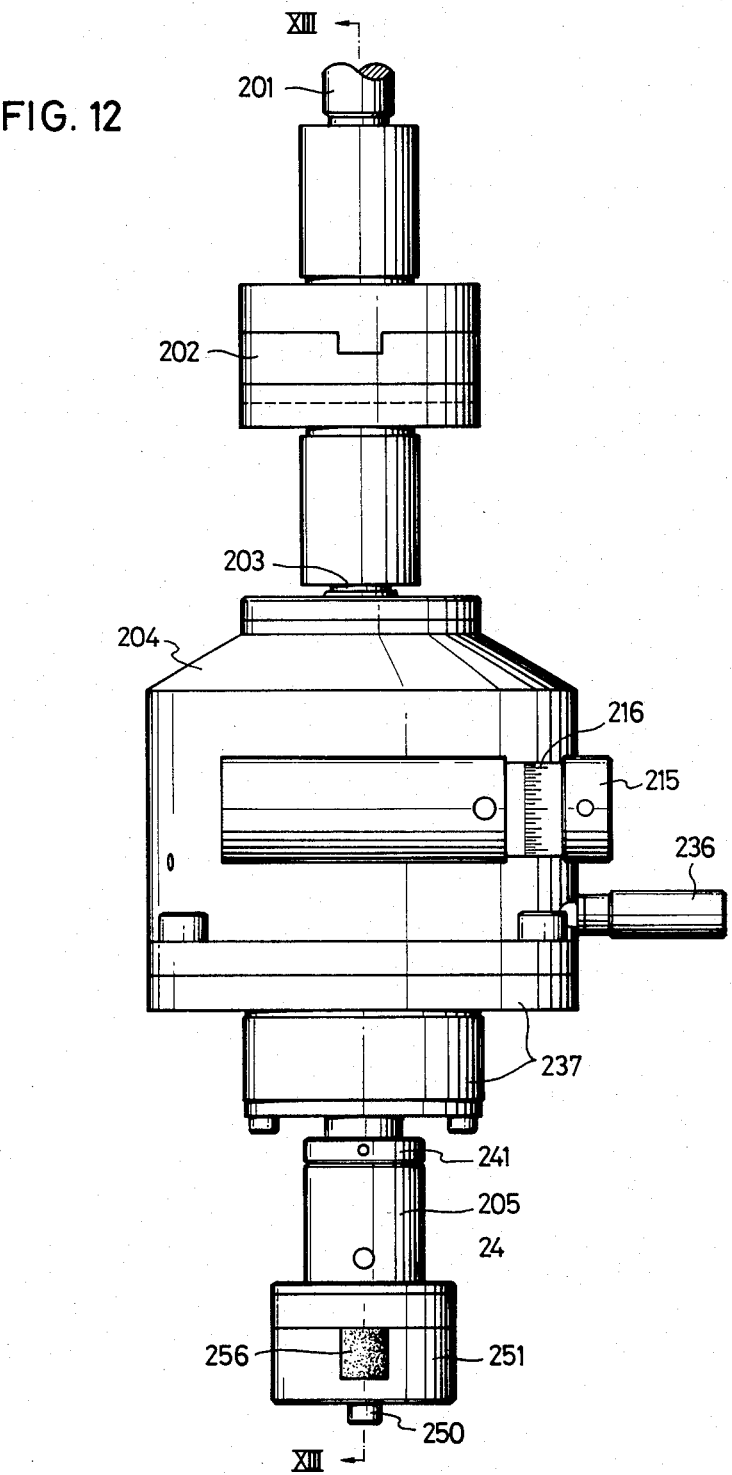
FIG. 12 is a front view showing the essential portions of a second embodiment of the internal grinder according to the present invention.
Figure 13:
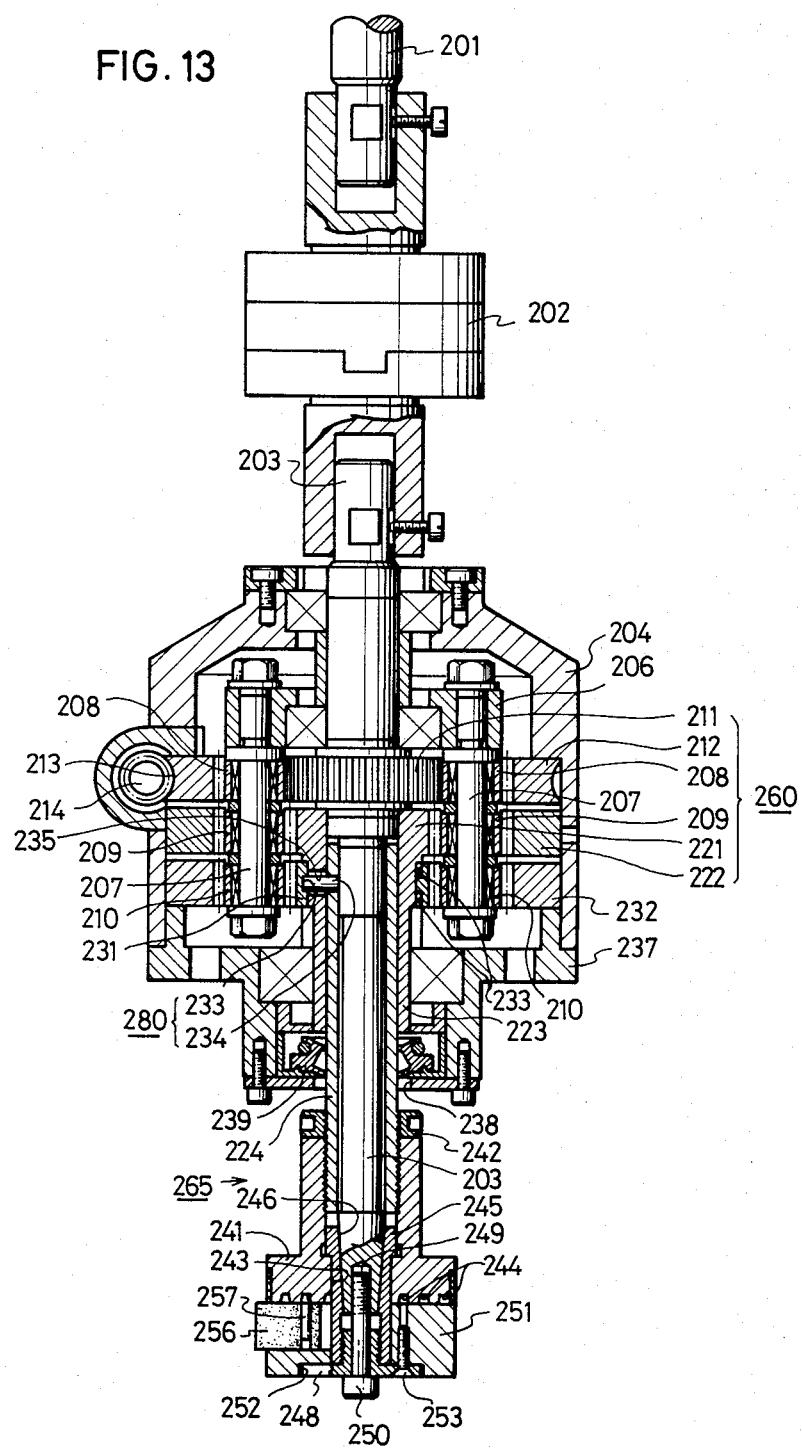
FIG. 13 is a sectional view taken along the line XIII—XIII in FIG. 12.

FIGS. 12 and 13 show the essential portions of the second embodiment. Referring to these drawings, one end of a rotary drive shaft 201 connected to an output shaft of a driving motor, not shown, or the like is connected to the top end portion of a spindle 203 through an Oldham coupling 202.

The spindle 203 is inserted through the central portion of a substantially inverted pot-shaped case member 204 as being a stationary portion. Affixed to the spindle 203 and mounted at the lower end portion thereof is a grind stone head 205. Additionally, a substantially cross-shaped rotary arm 206 is rotatably supported at a given position of the spindle 203 in the case member 204, and planet gear shafts 207 are journalled on respective sides of this rotary arm 206.

Four planet gear shafts 207 are provided around the spindle 203. These planet gear shafts 207 are rotatably provided at regular intervals on a hypothetical circumference centered about the spindle 203, through the rotary arm 206. First through third planetary gears 208 to 210 are rotatably supported by the planet gear shafts 207, respectively.

A motive power gear 211 as being a first sun gear is affixed to a given position on the spindle 203 closer to the grind stone head 205 than the position to which the rotary arm 206 is secured, in the case member 204. The first planet gear 208 is meshed with the motive power gear 211, and further, with a differential internal gear 212.

The differential internal gear 212 is adapted to be rotatable on the inner peripheral surface of the case member 204. Notched on the outer peripheral edge of the differential internal gear 212 is a rack portion 213, which is meshed with a worm gear 214. The rotary shaft of the worm gear 214 is provided at a given position of the outer peripheral portion of the case member 204 in the tangential direction thereof. A finger grip 215 and a graduation 216 are provided on one end of the worm gear 214. The finger grip 215 is handled for operating the worm gear 214 while the graduation 216 is watched, so that the differential internal gear 212 can be rotated.

The second planetary gear 209 is disposed downwardly of the motive power gear 211 in the drawing, and meshed with a transmission gear 221 as being a second sun gear having a form identical with the motive power gear 211 and a stationary internal gear 222 affixed to the inner periphery of the case member 204. A cylindrical portion 223 is integrally formed on the transmission gear 221 on the side of the grind stone head 205 thereof. The spindle 203 and a surrounding cylindrical shank 224 inserted through the interiors of the transmission gear 221 and the cylindrical portion 223.

The third planetary gear 210 is disposed downwardly in the drawing of the transmission gear 221, coupled onto the cylindrical portion 223, and meshed with a linear movement causing gear 231 having a gear form identical with the motive power gear 211 and the transmission gear 221 and a linear movement causing internal gear 232 rotatably provided on the inner periphery of the case member 204. Formed on the inner peripheral edge of the linear movement causing gear 231 is a spiral groove 233, into which is slidably coupled a projection 234 affixed to a given position of the shank 224, and, when the linear movement causing gear 231 is rotated relative to the shank 224, the shank 224 is moved relative 231 in the linear movement causing gear 231 in the vertical direction in the drawing i.e., is moved linearly.

The projection 234 is loosely inserted through an insert window 235 penetrated at a given position of the cylindrical portion 223, and then, coupled into the spiral groove 233. The insert window 235 is formed in a manner to have a predetermined length along the circumference of the cylindrical portion 223 and have such a width as to not disturb a movement of the projection in the vertical direction in the drawing. Furthermore, when the cylindrical portion 223 is rotated, the projection 234 is abutted against one end portion of the insert window 235, so that rotation of the transmission gear 221 can be imparted to the shank 224 even when the inner peripheral surfaces of the transmission gear 221, cylindrical portion 223 and the outer peripheral surface of the shank 224 are not in pressing contact with each other.

Projected from a given position of the linear movement causing internal gear 232 is a knob 236 (Refer to FIG. 12), which makes it possible to rotate the linear movement causing internal gear 232 from outside of the case member 204.

As shown in FIG. 13, secured to the lower opening portion of the case member 204 is a cover portion 237, through a central hole 238 of which the spindle 203 and the shank 224 are projected downwardly in the drawing, and provided around the shank 224 disposed within the central hole 238 is a seal ring 239 for preventing a lubricant oil from leaking out of the case member 204.

Inserted through the shank 224 is the spindle 203, which is projected a predetermined length downwardly from the bottom end portion of the shank 224, and center alignment of the spindle 203 with the shank 224 is effected at opposite ends of the shank 224.

Notched on the outer peripheral portion of the bottom end of the shank 224 is a threaded portion, at which the projection value adjusting member 241 of the grind stone head 205 is firmly, threadably secured by means of a clamping ring 242, so that the shank 224 and the projection value adjusting member 241 are adapted to be integrally rotated and vertically moved at all times. The outer peripheral portion of the shank 224 and the inner peripheral surfaces of the transmission gear 221, cylindrical portion 223 are brought into slidable surface to surface contact, and the projection value adjusting member 241 is adapted to be rotatable relative to the spindle 203 and movable in the axial direction of the spindle 203 within a predetermined range. Furthermore, this projection value adjusting member 241 is formed into substantially a cylindrical form, penetratingly provided at the central portion thereof with an insert hole 243, and further, formed at the bottom end face thereof with a projection value adjusting guide 244.

Figure 14:
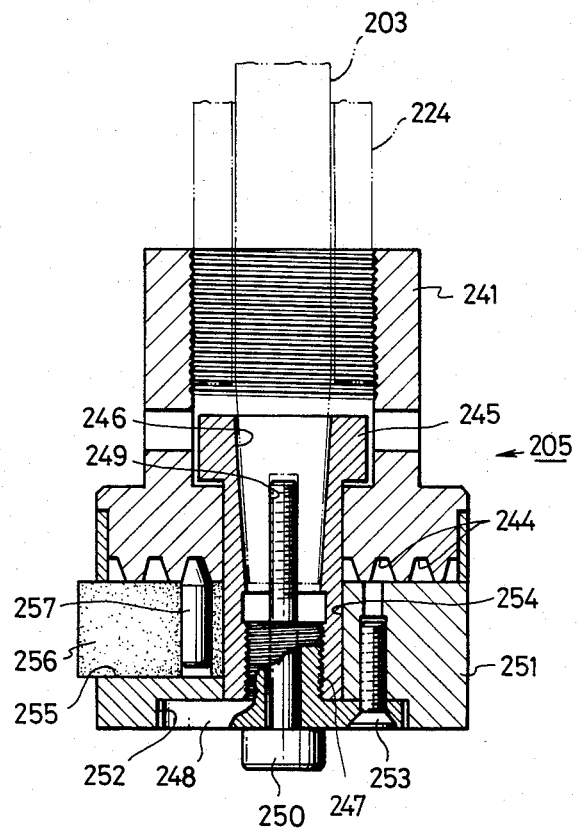
FIG. 14 is an enlarged sectional view showing the grind stone head used in the second embodiment.

On the other hand, a portion of the spindle 203, which is the outer peripheral surface of the lower end of the spindle 203, i.e., a portion projecting from the bottom end of the shank 224, is downwardly tapered, and, as enlargedly shown in FIG. 14, detachably taper-coupled onto the outer peripheral surface of this tapered portion is a tapered portion 246 of the inner peripheral surface of the upper end of the cylindrical member 245.

Solidly secured to the lower end of the cylindrical member 245 is a flange 248 integrally formed with a threaded portion 247 projecting in a cylindrical form, a shaft screw 250 is upwardly inserted through the central portion of the flange 248 in the axial direction of the spindle 203 and threadably coupled into a threaded hole 249 penetrated in the bottom end face of the spindle 203, and, when the shaft screw 250 is tightened, the tapered portion 246 and the tapered outer peripheral surface of the spindle 203 are brought into pressing contact and solidly secured to each other, so that rotation of the spindle 203 can be imparted to the cylindrical member 245.

Figure 15:
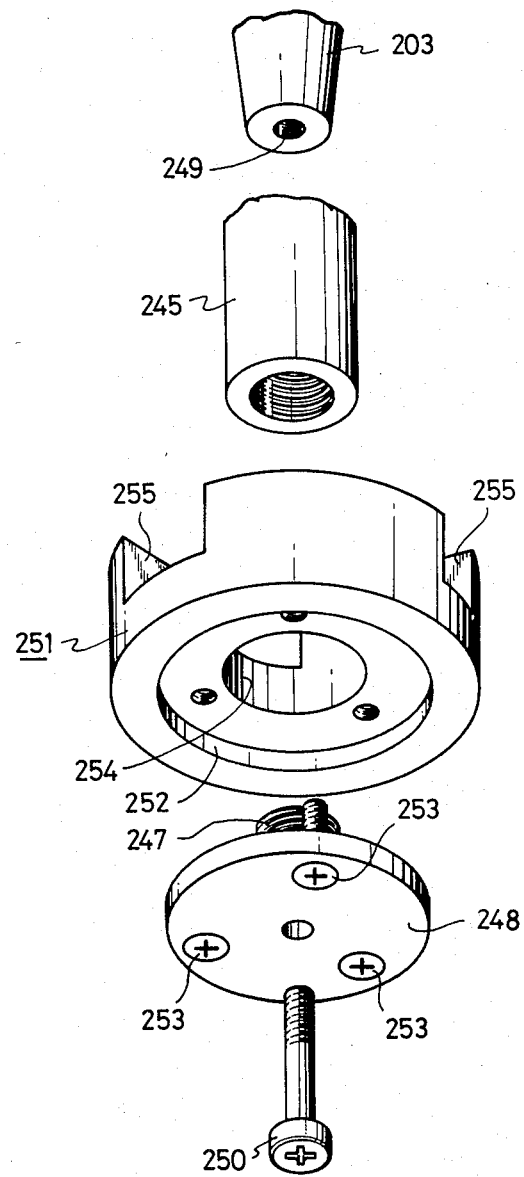
FIGS. 15 and 16 are disassembled perspective views showing the appearances of the essential portions of the grind stone head of the second embodiment as viewed from angles different from each other.

The flange 248 is coupled into a circular groove 252 notched on the bottom end face of the substantially columnar grind stone holding member 251, and affixed to the grind stone holding member 251 by means of three fixing screws 253 arranged at regular angular intervals of 120° on a hypothetical circumference centered about the spindle 203 (Refer to FIG. 15).

Figure 16:
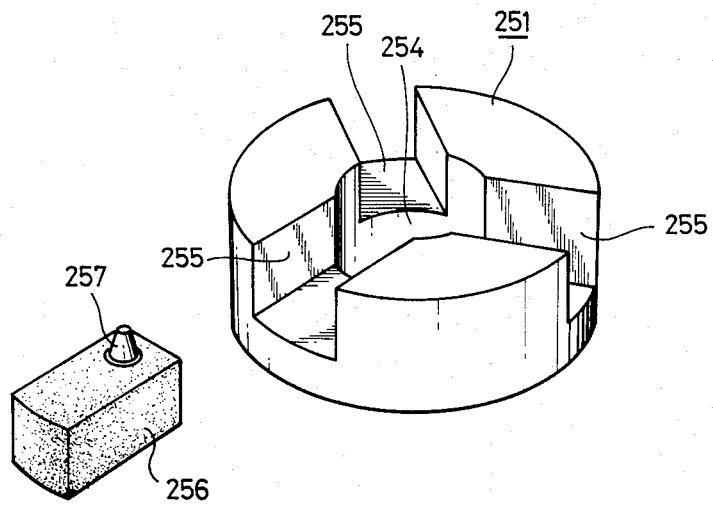

The grind stone holding member 251 is penetratingly provided at the central portion thereof with a central hole 254 for receiving therein the cylindrical member 245, and formed at the top end face thereof with radial guides 255 as shown in FIG. 16.

The three radial guides 255 are arranged at regular angular intervals of 120° as centered about the central hole 254 in the radial directions thereof, being opened on the side of the top end face of the grind stone holding member 251.

Substantially rectangular grind stones 256 are slidably coupled into the radial guides 255, respectively, and an adjusting pin 257 projects from the top end face of each grind stone 256 at a given position thereof. The grind stones 256 can be pressed on the grind stone holding member 251 by means of the bottom end face of the projection value adjusting member 255 in conditions of being coupled into the radial guides 255, and, in the conditions being pressed, the grind stones 256 are firmly clamped by the projection value adjusting member 241 and the grind stone holding member 251.

Furthermore, the adjusting pins 257 of the grind stones 256 are slidably coupled into the projection value adjusting guide 244 of the projection value adjusting member 241, and, when the projection value adjusting member 241 and the grind stone holding member 251 are rotated relative to each other, the projection values of the grind stones 256 in the radial direction are adjusted. Namely, the projection value adjusting guide 244 is formed into an Archimedean spiral, and hence, when the coupled-in positions of the adjusting pins 257 in the projection value adjusting guide 244 are moved, the positions of the grind stones 256 in the radial guides 255 are moved by distances equal to one another, accordingly.

The first and second planetary gears 208, 209, the motive power gear 211 as being the sun gear, the transmission gear 221, the differential internal gear 212 and the stationary internal gear 222 constitute a differential mechanism 260 for rotating the projection value adjusting member 241 relative to the grind stone holding member 251 during rotation of the spindle 203, and the spiral groove 233 and the projection 234 constitute a linear movement causing mechanism 280 for linearly moving the projection value adjusting member 241 relative to the grind stone holding member 251 in the axial direction of the spindle 203.

Description will now be given of operation of the present embodiment.

Rotation of the rotary drive shaft 201 is imparted to the spindle 203 through the Oldham coupling 202 so as to rotate the motive power gear 211. However, even if vibrations due to rotation occurs with the rotary drive shaft 201, the vibrations due to rotation are not imparted to the spindle 203 and the motive power gear 211 because the vibrations are absorbed by the Oldham coupling 202.

During normal operation, the projection 234 is fixed at a given position in the spiral groove 233, the grind stones 256 of the grind stone head 205 are firmly clamped between the projection value adjusting member 241 and the grind stone holding member 251, and, in the above-described condition, an internal grinding of the work is performed. During grinding, vibrations and the like do not occur with the grind stones 256, because the grind stones 256 are firmly held in the grind stone head 205.

When the motive power gear 211 rotates, the rotary arm 206 of the planetary gear mechanism constituted around the motive power gear 211 is rotated, rotation of the motive power gear 211, i.e., the spindle 203 is imparted to the cylindrical portion 223 integrally formed on the transmission gear 221 through the differential mechanism 260, and further, transmitted to the shank 224 through the projection 234 and the insert window 235, whereby the projection value adjusting member 241 solidly secured to the lower end portion of the shank 224 is rotated in synchronism with the spindle 203.

To adjust the projection values of the grind stones 256, the knob 236 is handled to rotate the linear movement causing internal gear 232 in the case member 204. When the linear movement causing internal gear 232 is rotated, the linear movement causing gear 231 is rotated relative to the shank 224 through the third planetary gear 210, whereby the coupled-in position of the projection 234 in the spiral groove 233 of the linear movement causing mechanism 280 is forcedly moved. When the coupled-in position of the projection 234 is moved to a predetermined position, the shank 224 is moved upwardly in the drawing, the projection value adjusting member 241 is moved upwardly relative to the grind stones 256 in the axial direction of the spindle 203 accordingly, whereby the grind stones 256 are released from the conditions where the grind stones 256 have been firmly clamped by the projection value adjusting member 241 and the grind stone holding member 251 to be tightly held in the grind stone head 205.

In the state where the grind stones 256 are released from clamped conditions in the grind stone head 205 as described above, the finger grip 215 is handled to rotate the differential internal gear 212 of the differential gear 260 in the case member 204, with the graduation 216 being inspected. When the differential internal gear 212 is rotated to change the rotational speed of the rotary arm 206, the rotational speed of the transmission gear 221 is changed accordingly, whereby the projection value adjusting member 241 is rotated relative to the grind stone holding member 251, so that the coupled-in positions of the grind stones 256 in the radial guides 255 can be changed, thereby enabling to adjust the projection values of the grind stones 256.

Upon completion of the adjustment of the projection values of the grind stones 256, the knob 236 is handled again to operate the linearly moving mechanism 280, the projection value adjusting member 241 is lowered toward the grind stones 256 to press thereon, whereby the grind stones 256 are brought into a state where they are firmly held in the grind stone head 205.

To remove the grind stone head 205 from the forward end of the spindle 203 for replacing the grind stone head 205 as a whole with a new one, if the shaft screw 250 is removed, the clamping ring 242 is loosened, and thereafter the projection value adjusting member 241 is detached from the shank 224, then the grind stone head 205 as a whole can be removed from the spindle 203 and the shank 224.

In the present embodiment with the above-described arrangement, the grind stone head 205 as a whole is detachably mounted on the main body of the grinder including the spindle 203, so that the grind stone head 205 as a whole can be easily replaced. In consequence, the present embodiment is advantageous in that the grind stone heads of various types can be replaceably used depending on the conditions of grinding such as the dimensions of the inner surfaces of the works.

During normal operation, the grind stones 256 are firmly clamped in the grind stone head 205, however, during adjustment of the projection values of the grind stones 256, the clamping of the grind stones 256 is released, so that fine adjustment of the projection values can be very smoothly performed. Moreover, during normal operation excluding the adjustment of the projection values, the grind stones 256 are firmly fixed, whereby a possibility of occurrence of vibrations during grinding and so forth is eliminated, so that the accuracy of grinding can be improved, thus enabling to extend the service lives of the grind stones 256.

Further, the adjustment of projection values of the grind stones 256 can be performed during rotation of the spindle 203, i.e., operation of the grinder, thus enabling to improve the workability.

Since the differential internal gear 212 can be rotated in the case member 204 by means of the rack portion 213 and the worm gear 214, it is advantageous in that both the operation and the fine adjustment are facilitated.

The rotary drive shaft 201 and the spindle 203 are connected through the Oldham coupling 202, whereby the vibrations due to rotation of the rotary drive shaft 201 are not imparted to the spindle 203, so that the accuracy of grinding can be improved.

In the above-described embodiment, the three grind stones 256 are described to be arranged at regular angular intervals of 120° as centered about the spindle 203, however, the number of the grind stones should not necessarily be limited to three, but, may be two, or four or more. The grind stones 256 should not necessarily be arranged at regular intervals. However, the arrangement of the grind stones 256 at regular intervals is advantageous in that the roundness in the inner surface grinding can be improved.

Further, the adjusting pins 257 are described to be directly embedded in the grind stones 256 and partially projected from the top end faces of the grind stones 256, however, such an arrangement may be adopted that the adjusting pins 257 are indirectly projectingly provided on the grind stones 256 as in the case where the grind stones 256 are affixed to grind stone holders slidably coupled into the radial guides 255 and the adjusting pins are embedded in the grind stone holders. Additionally, the adjusting pins 257 should not necessarily be provided, but, such an arrangement may be adopted that a projection integrally formed on a portion of each of the grind stones 256 or the aforesaid grind stone holders is engageable with the projection value adjusting guide 244.

The cylindrical member 245 and the flange 248 are formed separately from each other, however, these members may be integrally formed, and further, the cylindrical member 245, the flange 248 and the grind stone holding member 251 may be integrally formed.

Description will hereunder be given of the moving mechanism in the second embodiment with reference to FIGS. 17 through 21.

Figure 17:
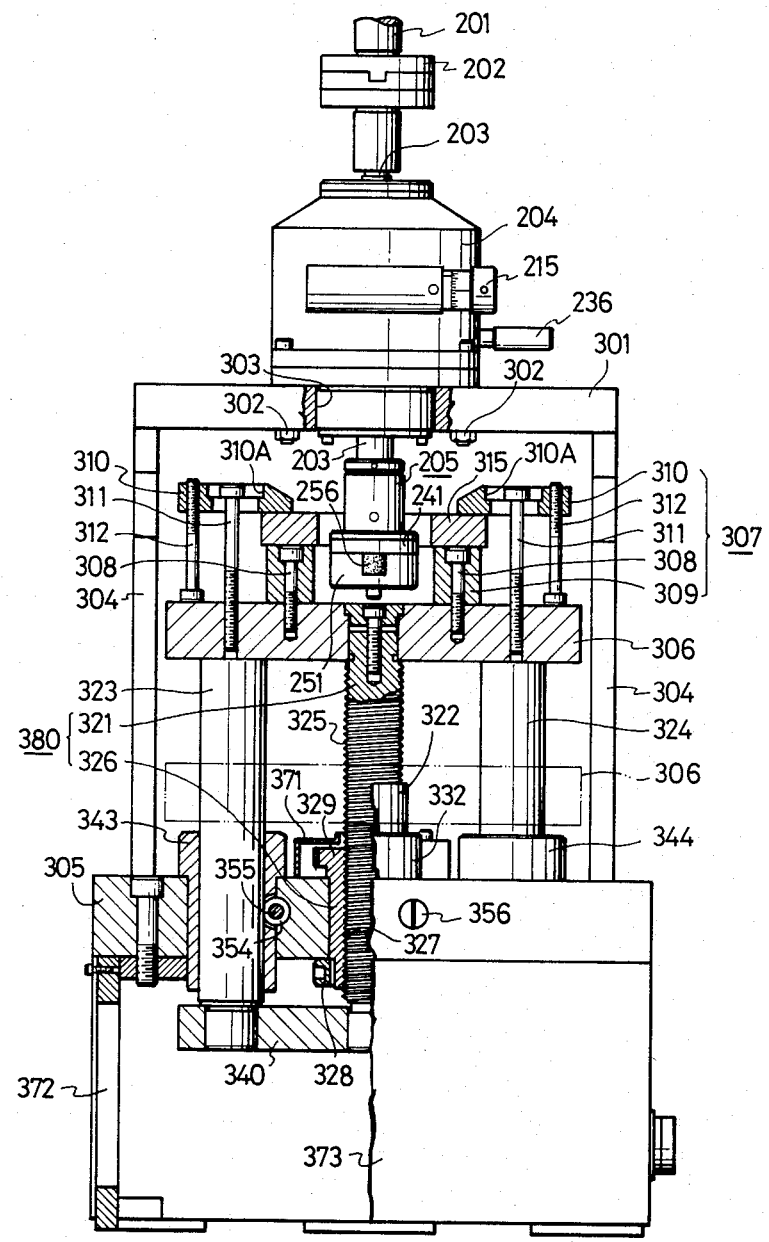
FIG. 17 is a front view, partially cut away, showing a mount used in the second embodiment.
Figure 18:
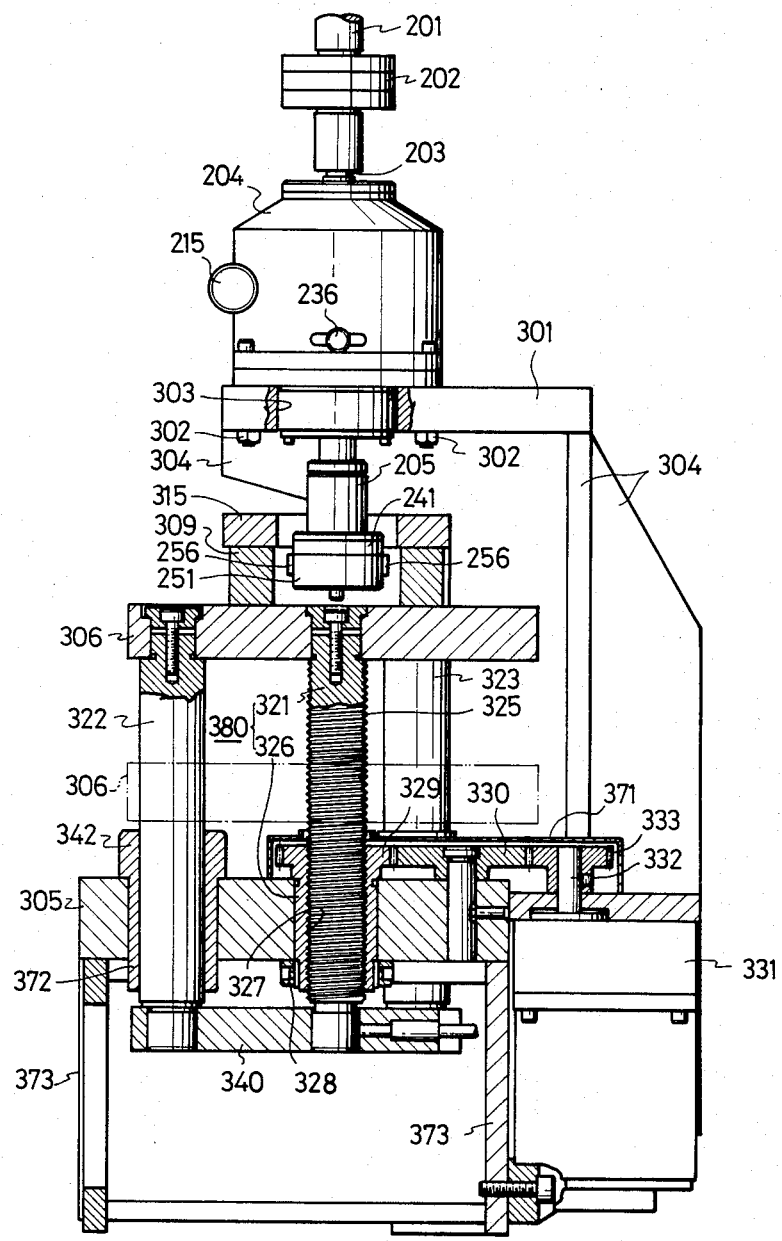
FIG. 18 is a right side view of FIG. 17.

Referring to FIGS. 17 and 18, the case member 204 is affixed onto a thick-wall square plate-like fixing plate 301 through a plurality of locking bolts 302, the grind stone head 205 is inserted downwardly in the drawing through a fixing hole 303 formed in the fixing plate 301, and the grind stone head 205 is disposed downwardly of the fixing plate 301. Additionally, plate-like supports 304 are provided at every end edges of the fixing plate 301 other than an end edge in front in FIG. 17, respectively, and the fixing plate 301 is affixed onto a base 305 at a predetermined height by means of these supports 304.

A disk-like mount 306 is vertically movably disposed downwardly of the grind stone head 205 and upwardly of the base 305, and the central portion of this mount 306 is positioned on an extension of the center line of the spindle 203.

Provided on the mount 306 is work fixing means 307. The work fixing means 307 is constituted by a short, thick-wall tubular bearer 309 detachably mounted on the mount 306 through a mounting bolt 308, a holding fixture 310 having a slot 310A, a supporting bolt 311 inserted through the slot 310A and linearly movably, threadably coupled to a given position of the mount 306, and a clamping bolt 312 whose forward end is linearly movably, threadably coupled to one end portion of the holding fixture 310 and whose proximal end is abutted against the top end face of the mount 306. A thick-wall ring-shaped work 315 mounted on the bearer 309 can be firmly fixed between the bearer 309 and the holding fixture 310 in a state where the grind stone head 205 is inserted into the inner surfaces of the work 315 through the adjustment of the supporting bolt 311 and the clamping bolt 312.

A drive shaft 321 for vertical movement is suspended through the central portion of the mount 306 downwardly in the drawing, and a first, a second and a third movable shafts 322, 323 and 324 are suspended downwardly in the drawing, being arranged at regular angular intervals of 120° on a hypothetical circumference centered about the aforesaid central portion. The drive shaft 321, and the movable shafts 322, 323 and 324 as described above are equal in length to one another, and the bottom end portions thereof are extended through a base 305, and thereafter, affixed to a seat plate 340 disposed downwardly of the base 305 in the drawing.

Formed on the peripheral surface of the drive shaft 321 is an externally threaded portion 325, which is threadably coupled to an internally threaded portion 327 formed on the inner peripheral surface of a cylindrical rotator 326, which in turn is supported by the central portion of the base 305 in a manner to be rotatable and unmovable in the axial line, and, when the aforesaid rotator 326 is rotated, the drive shaft 321 is adapted to move vertically. Here, the drive shaft 321 and the rotator 326 constitute a moving mechanism 380 for moving the mount 306 in the axial line of the spindle 203.

A stop ring 328 is threadably coupled to the bottom end portion of the cylindrical rotator 326, whereby the rotator 326 is prevented from moving in the axial line of the spindle 203, and, a toothed portion 329 is formed on the outer peripheral portion of the top end edge of the rotator 326.

The toothed portion 329 is meshed with a transmission gear 330 rotatably supported at a predetermined position of the base 305, this transmission gear 330 is meshed with a driving gear 333 solidly secured to an output shaft 332 of a driving motor 331 such as a pulse motor for vertical movement, and, when the driving motor 331 is rotated, the drive shaft 321 is adapted to be vertically moved.

The aforesaid three movable shafts 322, 323 and 324 are slidably inserted through a first, a second and a third sleeves 342, 343 and 344 in the axial lines thereof, respectively, the sleeves 342, 343 and 344 being coupled and affixed into predetermined positions on the base 305, which are disposed at regular angular intervals of 120° on a hypothetical circumference centered about the rotator 326.

Figure 19:
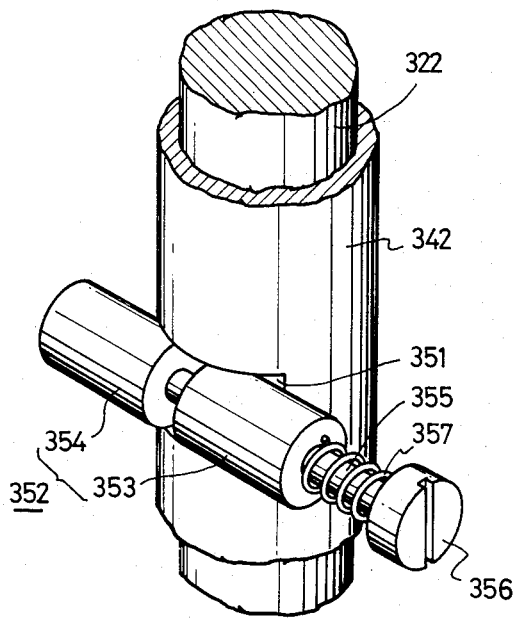
FIG. 19 is an enlarged perspective view showing the mounted state of an engageable member in the second embodiment.

Out of the three movable shafts 322, 323 and 324, the third movable shaft 324 is merely inserted through the aforesaid third sleeve 344, however, cut-away portions 351 are formed at predetermined positions of the first and the second sleeves 342 and 343, through which the first and the second movable shafts 322 and 323 are inserted, respectively, and engageable members 352 are slidably abutted against the outer peripheral surfaces of the movable shafts 322 and 323 through the cut-away portions 351, respectively (Refer to FIG. 19).

Figure 20:
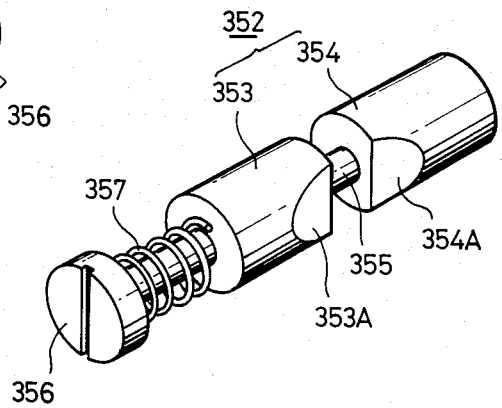
FIG. 20 is an enlarged perspective view showing the configuration of the engageable member.
Figure 21:
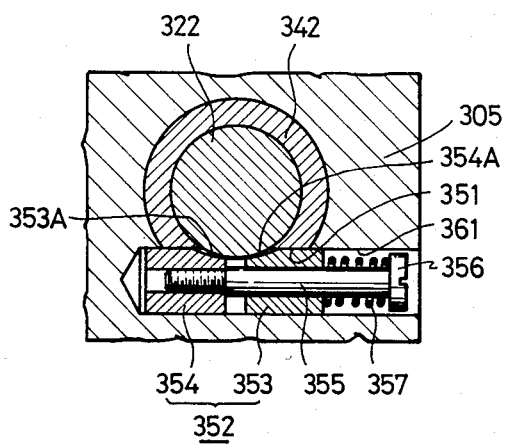
FIG. 21 is an enlarged sectional view showing the engaged state of a movable shaft with the engageable member.

As shown in FIG. 20, each engageable member 352 comprises a first and a second engageable pieces 353 and 354 each being of a cylindrical shape, a bolt 355 is slidably inserted through the central portion of the first engageable piece 353, the forward end of this bolt 355 is threadably coupled and affixed to the central portion of the second engageable piece 354 to a predetermined depth thereof, and the first and the second engageable pieces 353 and 354 are adapted to approach or recede from each other. Furthermore, a compression coil spring 357 as being biasing means is confined between a bolt head 356 of the bolt 355 and the first engageable piece 353, whereby this compression coil spring 357 biases the first and the second engageable pieces 353 and 354 to approach each other.

Tapered surfaces 353A and 354A are formed at given positions on the peripheral surfaces of the end portions of the first and the second engageable pieces 353 and 354 disposed in opposed relation to each other. Furthermore, the engageable pieces 353 and 354 are slidably received in receiving holes 361 penetrated in directions tangential to the outer peripheral surfaces of the movable shafts 322 and 323 in the base 305 and opened at the end edge of the base 305 (Refer to FIG. 21), and, when the two engageable pieces 353 and 354 received in the receiving holes 361 are biased to approach each other, the tapered surfaces 353A and 354A are slidably abutted against the outer peripheral surfaces of the movable shafts 322 and 323, whereby the slidable shafts 322 and 323 are pressed against the inner peripheral surfaces on one side of the sleeves 342 and 343.

Referring to FIGS. 17 and 18, reference numeral 371 is a cover surrounding the toothed portion 329, the transmission gear 330 and the driving gear 333, reference numeral 372 are support legs for supporting the base 305 at a predetermined position, and reference numeral 373 is a side cover for surrounding the undersurface of the base 305.

Description will hereunder be given of the case where grinding is performed by use of the mount 306.

The work 315 is mounted on the bearer 309, or directly rested on the mount 306 with the bearer 309 not being secured onto the mount 306 depending on the configuration of the work 315, and affixed onto the mount 306 by use of the work fixing means 307. The center alignment between the grind stone head 205 and the work 315 in affixing the work 315 to the mount 306 is performed as follows. When the grind stones 256 of the grind stone head 205 is projected before the work 315 is fixed, and then, abutted against the inner surface of the work 315, the centering alignment is achieved. Thus, in this condition, the work 315 may be affixed onto the mount 306 by use of the work fixing means 307. In consequence, there is no need at all for performing the centering alignment between the grind stone head 205 and the work 315 by moving the grind stone head 205 or the mount 306 in the horizontal direction in the drawing, the centering work can be very quickly and accurately performed.

To change a portion being ground to another, the mount 306 is vertically moved. To vertically move the mount 306, the rotator 326 of the moving mechanism 380 is rotated by a predetermined value by means of the driving motor 331 for vertical movement, whereby the drive shaft 321 is vertically moved by a predetermined value, so that the mount 306 can be vertically moved by a predetermined value.

In the vertical movement, two movable shafts 322 and 323 out of the three movable shafts 322, 323 and 324 slide in the sleeves 342, 343, while being abutted against the engageable members 352, respectively. The two engageable pieces 353 and 354 of the engageable members 352 are biased to approach each other in the receiving holes 361, and the outer peripheral surfaces of the movable shafts 322 and 323 are brought into line-to-line contact with the tapered surfaces 353A and 354A and biased in a direction opposite to the position thus contacted to be urged against the inner peripheral surfaces of the sleeves 342 and 343, whereby clearances are eliminated at the portions thus urged, so that, in the movable shafts 322 and 323, even very fine vibrations due to movement can be eliminated. Furthermore, even if repulsive forces of the movable shafts 322 and 323 act on the engageable members 352, there are components of the repulsive forces small in values in directions of the compression coil springs 357 being elongated or shrunk, i.e., moving directions of the engageable pieces 353 and 354. Consequently, the aforesaid clearances can be reliably eliminated without requiring to make the compression coil springs 357 to be particularly strong in resilient forces.

In addition, the tapered surfaces 353A and 354A, and the outer peripheral surfaces of the movable shafts 322 and 323 are in line-to-line contact with each other in the moving directions of the movable shafts 322 and 323, and, although the movements of the movable shafts 322 and 323 are made while being abutted thereagainst with the engageable members 352, the movable shafts 322 and 323 can be moved very smoothly.

Out of the three movable shafts 322, 323 and 324 provided on the mount 306, the two movable shafts 322 and 323 are prevented from vibrating by the engageable members 352, the respective bottom end portions of the movable shafts 322, 323 and 324 are affixed to one another by the seat plate 340, and the mount 306 is vertically moved in a condition where even very fine vibrations can be prevented.

The following advantages can be obtained by the use of the mount 306.

Since the mount 306 is vertically movable and the grind stone head 205 is firmly fixed by the fixing plate 301, such advantages can be offered that construction as a whole is simplified as compared with the case where the grind stone head 205 is made movable, it becomes easy to move the grind stone head 205 and the mount 306 relative to each other over a long range of distance, and grinding work with satisfactorily high accuracy can be performed even when the respective components are finished to ordinary levels.

Since, out of the three movable shafts 322, 323 and 324 for supporting the mount 306, the two movable shafts 322 and 323 are prevented from vibrating by being abutted by the engageable members 352 and even fine vibrations in the horizontal direction and rotating direction as well while the mount 306 is vertically moved, such advantages can be offered that the vibrations due to rotation of the rotary drive shaft 201 is not imparted to the spindle 203 through the agency of the Oldham coupling 202, which, in cooperation with the fact that the grind stone head 205 is fixed by the fixing plate 301, can achieve grinding with very high accuracy.

Moreover, the engageable members 352, being simplified construction, can be easily, additionally provided on the ordinary movable shafts as sleeves, and further, readily adjust the abutting forces applied to the movable shafts 322 and 323 by turning the bolt head 356. Even if the repulsive forces are applied from the movable shafts 322 and 323 to the engageable members 352, only the slight values of the components of the repulsive forces act on the compression coil springs 357, and hence, such an advantage can be offered that the movable shafts 322 and 323 are reliably prevented from vibrating without requiring to use the compression coil spring having a particularly high value of resiliency.

In addition, in the foregoing description, the respective movable shafts 322 and 323 are each provided with one engageable member 352, however, such arrangement may be adopted that the respective movable shafts are each provided with two engageable members, so that the prevention of vibrations can be further improved. The engageable members 352 are abutted against the outer peripheral surfaces of the movable shafts 322 and 323 through the cut-away portions 351 formed in the sleeves 342 and 343, however, such an arrangement may be adopted that no cut-away portions 351 or the like are provided in the sleeves 342 and 343 and the engageable members 352 are provided outwardly of the top and bottom end portions of the sleeves.

Furthermore, out of the three movable shafts 322, 323 and 324, only the two movable shafts are provided thereon with the vibration preventing mechanisms, however, such an arrangement can be adopted that all of the movable shafts 322, 323 and 324 are provided thereon with the vibration preventing mechanisms. Further, such an arrangement may be adopted that the mount 306 should necessarily be provided with four or more movable shafts and the vibration preventing mechanisms are provided on all or some of the movable shafts.

As has been described hereinabove, the present invention can provide an internal grinder in which the centering work for the work is facilitated and grinding with high accuracy can be performed.

INDUSTRIAL AVAILABILITY

As described above, the internal grinder according to the present invention is suitable for high accuracy grinding and high accuracy polishing of various inner surfaces which requires high accuracy grinding of the inner surfaces of cylinders and ring gauges for example, and suitable for general grinding as well.

We claim:
1. An internal grinder, comprising:
a grind stone head;
a plurality of grind stones arranged circumferentially on said grind stone head, the radial projection values of the grind stones being adjustable during rotation of said grind stone head, said grind stone head including a grind stone holding member having radial guides to guide the grind stones, said grind stone holding member being affixed to one end of a spindle;
a projection value adjusting member affixed to one end of a shank coupled onto said spindle, said projection value adjusting member having a projection value adjusting guide formed as an Archimedean spiral with its origin positioned on the axial line of said spindle, said projection value adjusting guide having slidably inserted therein adjusting pins affixed to said grind stones to thereby engage said projection value adjusting guide with said grind stones;

a differential mechanism including a motive power gear fixed to said spindle, a differential internal gear connected to a finger grip means carried on the outer peripheral portion of a case member, and at least two planet gears;

a linear movement causing mechanism having a linear movement causing gear rotatable alternatively in synchronism with and relative to said spindle;

said linear movement causing mechanism further having means responsive to rotation of said linear movement causing gear relative to said spindle for axially moving said shank with respect to said spindle, for allowing the adjustment of said radial projection values, said means for axially moving including slidably coupled members fixed on said shank and linear movement causing gear, said slidably coupled members being a spiral groove and a projection slidably coupled in said spiral groove;

a mount having work fixing means; and a moving mechanism for moving said grind stone head relative to the mount in the axial direction of said spindle.

2. An internal grinder as set forth in claim 1, wherein said motive power gear being a sun gear affixed to said spindle, a transmission gear formed as a second gear and coupled onto said shank, said planet gears comprising first, second and third planet gears rotatably supported on the same planet gear shaft, said first planet gear meshing with said motive power gear and said differential internal gear which latter is rotatably provided on said case member, said second planet gear meshing with said transmission gear and a stationary internal gear affixed to said case member, said third planet gear meshing with said linear movement causing gear slidably coupled with respect to said shank and a linear movement causing internal gear rotatably provided on said case member, said spiral groove extending axially of said spindle and formed on said linear movement causing gear, said projection being provided on said shank and slidably coupled into said spiral groove, such that said differential mechanism includes said motive power gear, said transmission gear, said first planet gear, said second planet gear, said differential internal gear and said stationary internal gear.

3. An internal grinder as set forth in claim 2, wherein said grind stone holding member is detachably taper-coupled to one end of said spindle, said projection value adjusting member is detachably affixed to said differential mechanism, and said grind stone head is detachably provided as a whole at the one end of the spindle.

4. An internal grinder as set forth in claim 3, wherein said mount is supported on a base in a manner to be linearly movable relative to the grind stone head though a plurality of movable shafts arranged in parallel to one another, a drive shaft formed at the outer periphery thereof with an externally threaded portion rotatably secured to said mount in parallel to said movable shaft, said drive shaft being threadably coupled to an internally threaded portion of a rotator secured to said base in a manner to be rotatable and unmovable axially of said drive shaft, and said moving mechanism includes said drive shaft and said rotator.

5. An internal grinder as set forth in claim 4, wherein the number of said movable shafts is at least three, at least two of said movable shafts are slidably inserted through respective sleeves, engageable members abuttable against the outer peripheral surfaces of respective said movable shafts and said engageable members are provided therein with biasing means to bias said movable shafts in the respective sleeves with respect to the inner peripheral surfaces thereof.

6. An internal grinder comprising:

a grind stone head, in which a plurality of grind stones are arranged in a circumferential direction of said grind stone head, and radial projection values of the grind stones are adjustable during rotation of said grind stone head;

said grind stone head including a grind stone holding member having radial guides to guide the grind stones and affixed to one end of a spindle, and a projection value adjusting member opposed to said radial guides, having a projection value adjusting guide having engaged therewith the grind stones and affixed to one end of a shank coupled onto said spindle, said shank being rotatable in synchronism with said spindle and also rotatable relative to said spindle through a differential mechanism; and said internal grinder further comprises a mount having work fixing means and a moving mechanism for moving said grind stone head relative to the mount in the axial direction of said spindle;

said shank being provided thereon with a projection slideably coupled into a spiral groove extending in the axial line of the spindle, said spiral groove is formed on a linear movement causing gear being rotatable in synchronism and relative to the spindle, and, when the linear movement causing gear is rotated relative to the spindle, said shank is moved in the axial line of the spindle during rotation of the spindle to allow for the adjustment of the radial projection values.

7. An internal grinder comprising:

a grind stone head, in which a plurality of grind stones are arranged in a circumferential direction of said grind stone head, and radial projection values of the grind stones are adjustable during rotation of said grind stone head;

said grind stone head including a grind stone holding member affixed to one end of a spindle and having radial guides to guide the grind stones, and a projection value adjusting member affixed to one end of a shank coupled onto the spindle, being opposed to said radial guides and having a projection value adjusting guide having engaged therewith the grind stones;

said spindle and said shank being connected to each other in a manner to be roatatable relative to each other through a differential mechanism and also movable in the axial line of said spindle through a linear movement causing mechanism for allowing adjustment of the radial projection values; and said internal grinder further comprises a mount having work fixing means and a moving mechanism for moving said grind stone head relative to the mount in the axial direction of said spindle;

a motive power gear formed as a sun gear and affixed to said spindle, a transmission gear formed as a second sun gear and coupled onto said shank, first and second and third planet gears rotatably supported on the same planet gear shaft, said first planet gear meshing with said motive power gear and a differential internal gear rotatably provided on a case member, said second planet gear meshing with said transmission gear and a stationary internal gear affixed to said case member, said third planet gear meshing with a linear movement causing gear slidably coupled with respect to said shank and a linear movement causing internal gear rotatably provided on said case member, a spiral groove extending axially of said spindle and formed on said linear movement causing gear, a projection being provided on said shank and slidably coupled into said spiral groove, said differential mechanism including said motive power gear and said transmission gear and said first planet gear and said second planet gear and said differential internal gear and said stationary internal gear, said linear movement causing mechanism including said spiral groove and said projection.

* * * * *